Patented June 24, 1952

2,601,536

UNITED STATES PATENT OFFICE 2,601,536

PRODUCTION OF TETRAFLUOROETHYLENE FROM A SALT OF TRIFLUOROACETIC ACID

James Donald La Zerte, St. Paul, Minn., assignor to Minnesota Mining & Manufacturing Company, St. Paul, Minn., a corporation of Delaware No Drawing. Application May 8, 1950,
Serial No. 160,815

1 Claim. (Cl. 260—653)

This invention relates to my discovery of a novel process for the production of tetrafluoroethylene, an olefinic fluorocarbon compound having the formula $CF_2 : CF_2$.

It would be expected on the basis of prior knowledge that the pyrolysis of metal trifluoroacetate salts in the presence of a base would not yield $CF_2 : CF_2$ but would result in degradation products such as acid fluoride, acid anhydride and fluoroform. It is a well known fact that the pyrolysis of metal trifluoroacetate salts which occurs upon heating is an endothermic reaction which results in the production of degradation products which are not fluorocarbons (consisting solely of fluorine and carbon). (Swarts, Bull. Sci. Acad. Roy. Belg., 8, 343 (1922); Simons et al., J. Am. Chem. Soc., 62, 3477 (1940)).

I have made the unexpected discovery that upon heating an anhydrous mixture of an alkali metal trifluoroacetate salt and an alkali metal hydroxide, a strongly exothermic reaction is initiated which spontaneously continues to completion and results in the formation of $CF_2 : CF_2$ as the dominant carbon-fluorine reaction product.

Degradation reactions take place only to a minor extent. By proper control the formation of $CF_2 : CF_2$ can be maximized so that substantially the only carbon compound product, other than $CO_2$, is $CF_2 : CF_2$. The alkali metal hydroxide acts catalytically. Apparently the $CF_2 : CF_2$ is formed by the combining of free difluoromethylene radicals released by the decomposition of the alkali metal trifluoroacetate salt.

The following equations represent this reaction process in the illustrative case where an anhydrous mixture of sodium trifluoroacetate and sodium hydroxide is employed as the starting material.

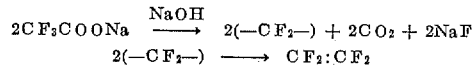

$$2CF_3COONa \xrightarrow{NaOH} 2(-CF_2-) + 2CO_2 + 2NaF$$
$$2(-CF_2-) \longrightarrow CF_2:CF_2$$

The activation temperature necessary for initiating the exothermic reaction is of the general order of 200° C. The reaction heat thereafter suffices to maintain the mixture at the necessary reaction temperature. Thus a self-propagating chain reaction is involved. Temperatures in the vicinity of 100° C. can be employed in dehydrating the salt-base mixture without causing decomposition.

This discovery resulted from an experiment wherein an aqueous solution containing 61 grams (0.45 mol) of sodium trifluoroacetate and 9 grams (0.23 mol) of sodium hydroxide had been evaporated and the salt-base residue mixture had then been dried at 120° C. at atmospheric pressure. The dried residue was placed in a 250 ml. glass distilling flask which was heated by an electric furnace. When the furnace temperature reached 270° C., the temperature of the reaction mixture suddenly rose to 360° C. and there was a rapid evolution of gases. A sample of the gaseous products was shown by molecular weight and infrared spectrum determinations to consist of approximately 85 mol percent $CO_2$ and 15 mol percent $CF_2 : CF_2$.

In another experiment a dried salt-base mixture was prepared consisting of 51 grams (0.38 mol) of sodium trifluoroacetate and 11 grams (0.25 mol) of sodium hydroxide, which had been dried at about 120° C. This was charged to a glass ampoule tube 24 inches long and 1 inch in diameter, sealed at one end and connected at the other end to a condensing trap cooled by liquid air. An electric furnace was heated to 225° C. and the tube was slowly fed into the heated zone. Reaction started when only a short length of the tube had been introduced. Although the tube was immediately withdrawn, the reaction zone progressed rapidly from the initially heated section to the material which had not been externally heated and stopped only when substantially all of the starting material had reacted. Subsequent heating of the residue to 225° C. caused no further liberation of gas. The condensate consisted of 22 grams of material which was found to consist of 75% $CO_2$, 15% $CF_2 : CF_2$, 5% $CF_3COF$ and 5% $CF_3H$, on a mol percent basis. The actual yield was greater since some of the salt did not decompose but was removed from the reaction zone by the gaseous products.

It will be apparent to chemists skilled in the art that the design of commercial scale apparatus and procedures will require the use of suitable expedients for controlling the reaction in view of its strongly exothermic nature. Such expedients are well known to chemical engineers and need not be described in detail. Use can be made of inert diluents (such as fluorocarbon compound liquids and finely divided inert solids) with provision for transfer of heat from the reaction zone, and with controlled feeding of the starting material into the reaction zone. The tetrafluoroethylene can be readily recovered from the gaseous product mixture by the use of chemical and of fractional distillation separation procedures.

I claim:

A process for the production of $CF_2 : CF_2$ (tetrafluoroethylene) which comprises sufficiently heating an anhydrous mixture of an alkali metal trifluoroacetate salt and an alkali metal hydroxide to initiate an exothermic reaction and allowing it to continue with formation of $CF_2:CF_2$ as the dominant carbon-fluorine reaction product, and recovering the latter.

JAMES DONALD LA ZERTE.

REFERENCES CITED

The following references are of record in the file of this patent:

Swarts: Bull. Sci. Acad. Roy. Belg., 8, page 343 (1922).

Simons et al.: J. Am. Chem. Soc., 62, page 3477 (1940).